No. 615,119. Patented Nov. 29, 1898.
W. C. WILLIAMSON.
THRUST BEARING FOR WORM GEARS.
(Application filed June 28, 1898.)
(No Model.) 2 Sheets—Sheet 1.

Witnesses:—
Wm. A. Barr.
Louis M. T. Whitehead.

Inventor:
William C. Williamson.
by his Attorneys
Howson & Howson

No. 615,119. Patented Nov. 29, 1898.
W. C. WILLIAMSON.
THRUST BEARING FOR WORM GEARS.
(Application filed June 28, 1898.)
(No Model.) 2 Sheets—Sheet 2.

Witnesses:-
Will. A. Barr.
Louis M. F. Whitehead.

Inventor:-
William C. Williamson,
by his Attorneys,-
Howson & Howson

UNITED STATES PATENT OFFICE.

WILLIAM C. WILLIAMSON, OF PHILADELPHIA, PENNSYLVANIA, ASSIGNOR TO THE WILLIAMSON BROTHERS COMPANY, OF SAME PLACE.

THRUST-BEARING FOR WORM-GEARS.

SPECIFICATION forming part of Letters Patent No. 615,119, dated November 29, 1898.

Application filed June 28, 1898. Serial No. 684,672. (No model.)

*To all whom it may concern:*

Be it known that I, WILLIAM C. WILLIAMSON, a citizen of the United States, residing in Philadelphia, Pennsylvania, have invented certain Improvements in Thrust-Bearings for Worm-Gears, of which the following is a specification.

My invention relates to certain improvements in thrust-bearings for worm-gearing, and is especially designed for the gearing of steering and hoisting mechanism.

The object of my invention is to take up the end wear of the worm-gear and to so regulate the worm in respect to its wheel that it will always bear the proper relation to it.

Figure 1:
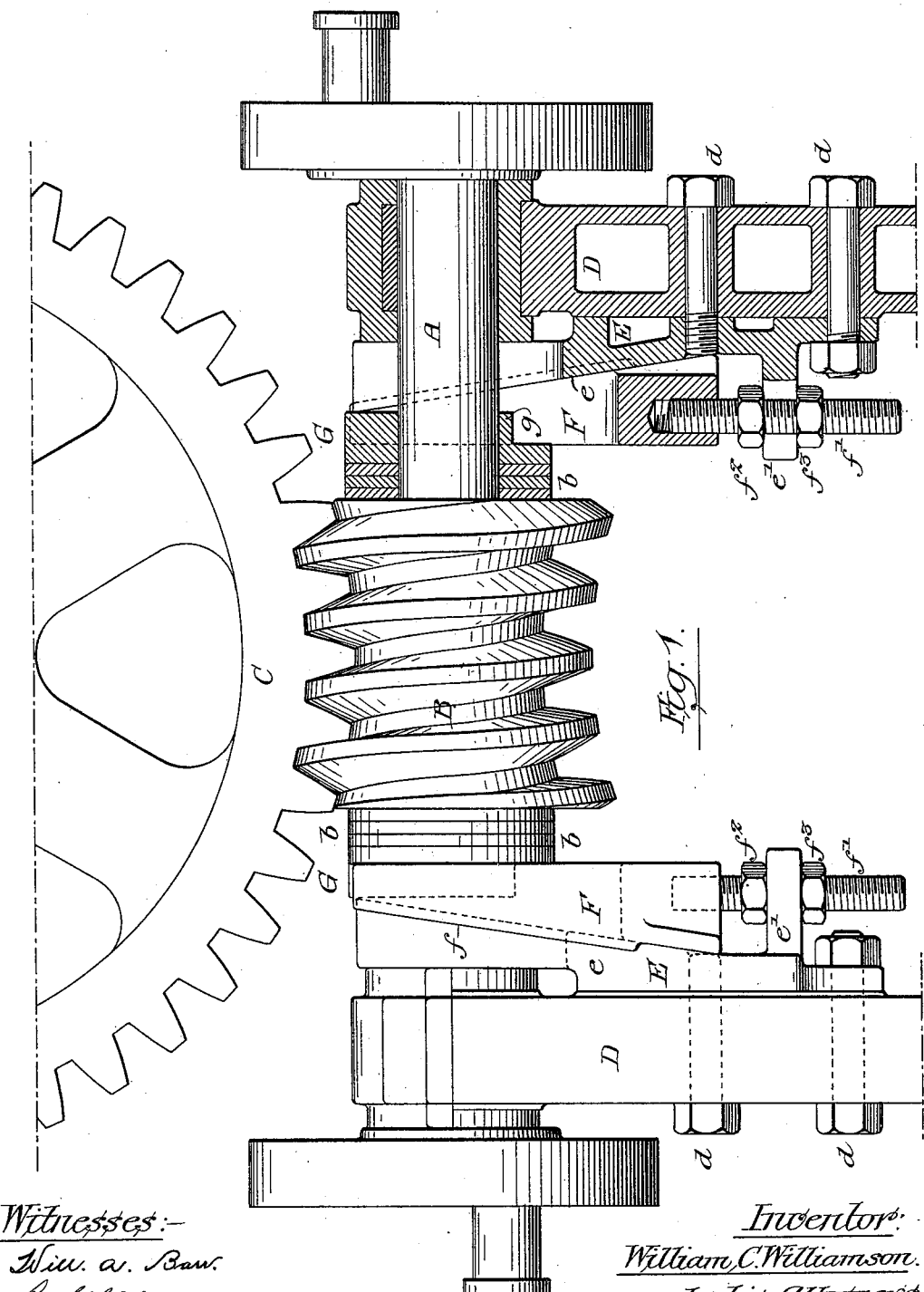
Figure 2:
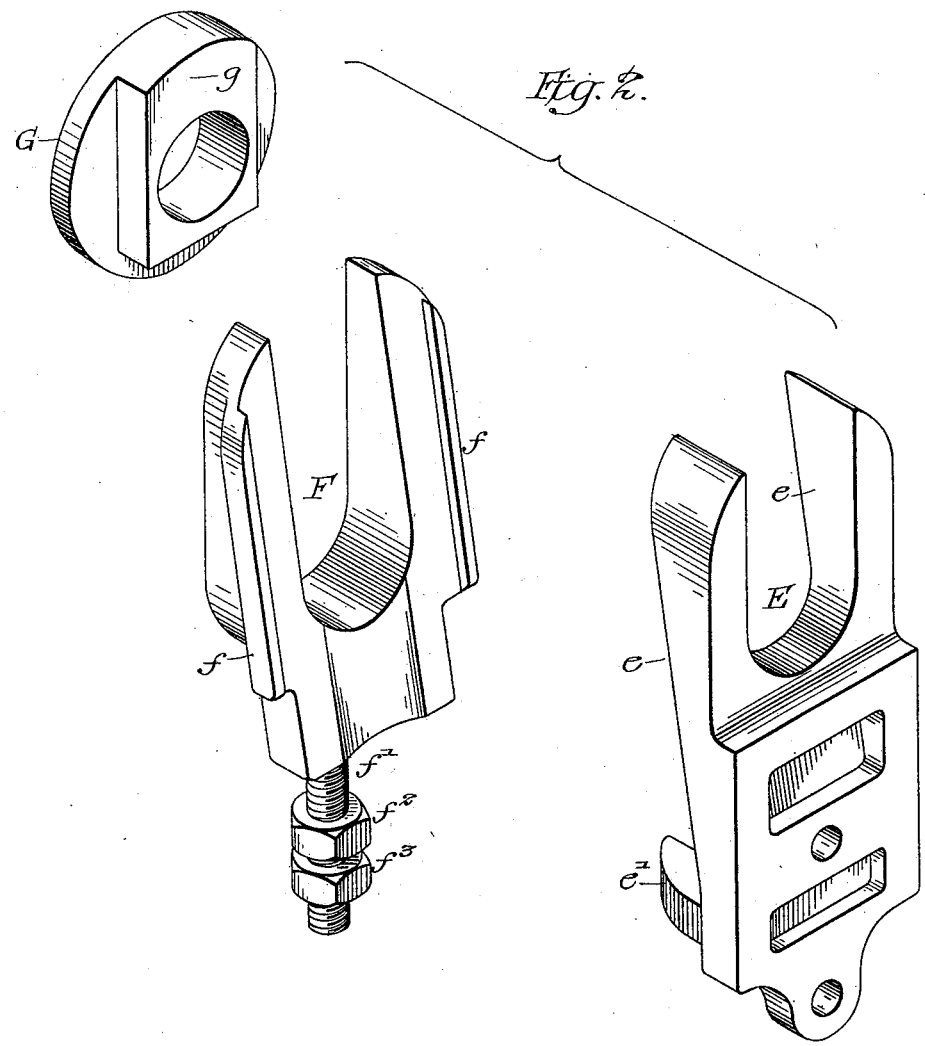

In the accompanying drawings, Figure 1 is a view of my improved thrust-bearing for worm-gearing, partly in section; and Fig. 2 is a detached perspective view of parts illustrating my invention.

A is the worm-shaft, on which is mounted the worm B.

C is a worm-wheel meshing with the worm.

D D are the two bearings for the worm-shaft, and secured to the inner side of each bearing is a block E, having a tapered portion $e$ and a lug $e'$. The blocks are secured to the bearings by bolts $d\,d$ and are forked to extend on both sides of the shaft A, so as to give an extended bearing to the wedge F.

Adapted to the tapered portion of each block is a wedge F, having lips $f\,f$ at each edge, which extend over the sides of the block. These wedges are also forked, so as to extend on each side of the shaft A. Projecting from the lower edge of each wedge is a threaded rod $f'$, which passes through the opening in the lug $e'$ and is provided with two nuts $f^2\,f^3$, one above and the other below the lug $e'$, so that by adjusting the nuts on the rod the wedge can be moved on the block.

Mounted on the shaft at each end of the worm is a loose sleeve G, having a squared extension $g$, which enters the forked portion of the wedge F and prevents the sleeve from turning with the shaft and at the same time gives an extended bearing to the wedges. On the shaft A, between the sleeves G G and the worm, are a series of washers $b\,b$, so that the worm will turn freely, although held snugly in position by the wedges.

It will be seen that the adjusting devices are readily mounted and can be set to take up the wear at either end of the worm-wheel, and if the worm is out of line with the wheel one wedge can be backed off and the other set up until the two are in line.

In some instances the block E may form part of the bearing instead of being attached thereto, as shown.

I claim as my invention—

1. The combination of a shaft, a worm thereon, two bearings, one on each side of the worm, a block secured to each bearing and having a tapered face, a wedge between each bearing and the worm, and means for adjustably securing the wedges to the blocks, substantially as described.

2. The combination of a shaft, a worm thereon, a sleeve loose on the shaft and having a squared projection, a bearing having a tapered face, a forked wedge adapted to the tapered face of the bearing and extending on each side of the projection of the sleeve, substantially as described.

3. The combination of a shaft, a worm thereon, a sleeve loose on the shaft and having a projection, a bearing, a block having a tapered and forked portion and secured to the bearing, a forked wedge mounted between the block and the sleeve and adapted to pass on each side of the projection of the sleeve, with means for adjusting the wedge, substantially as described.

4. The combination of a shaft, a worm thereon, a sleeve loose on the shaft, a bearing for the shaft, a tapered block secured to the bearing, a forked wedge mounted between the sleeve and the tapered block and passing on each side of the projection, lips on the wedge overlapping the block, and means for adjusting the wedge, substantially as described.

5. The combination of a shaft, a worm thereon, two bearings one on each side of the worm, loose sleeves between the bearing and the worm and washers between the sleeves and the worm, a block secured to each bearing and having a forked tapered portion extending on each side of the shaft, a wedge adjustable on the tapered portion of each block and forked and extending on each side of a projection on each sleeve, a screw-rod depending from each wedge, and nuts on the rod engaging a lug on the block, substantially as described.

In testimony whereof I have signed my name to this specification in the presence of two subscribing witnesses.

WILLIAM C. WILLIAMSON.

Witnesses:
WILL. A. BARR,
JOS. H. KLEIN.